Feb. 27, 1923. 1,446,517
H. P. REED
BRAKING APPARATUS
Filed Oct. 7, 1918 2 sheets-sheet 2
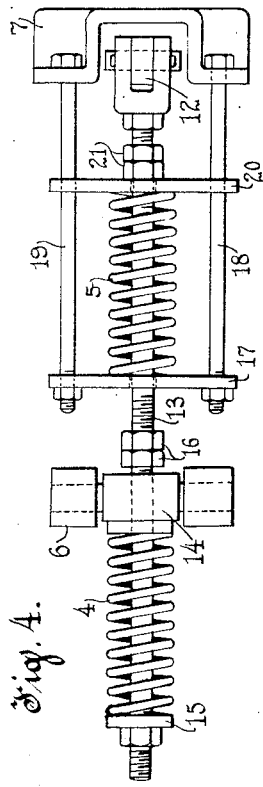
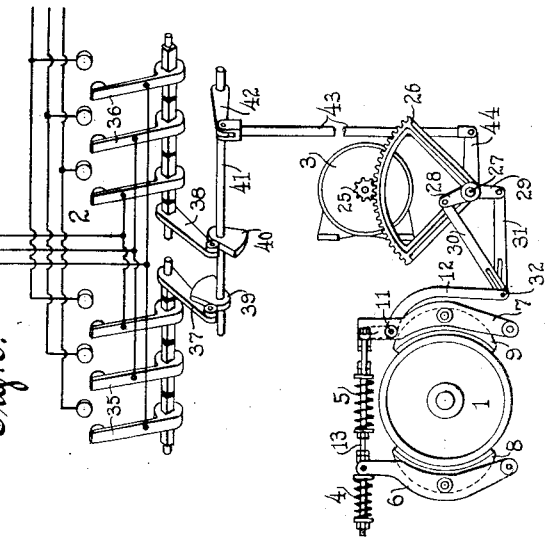
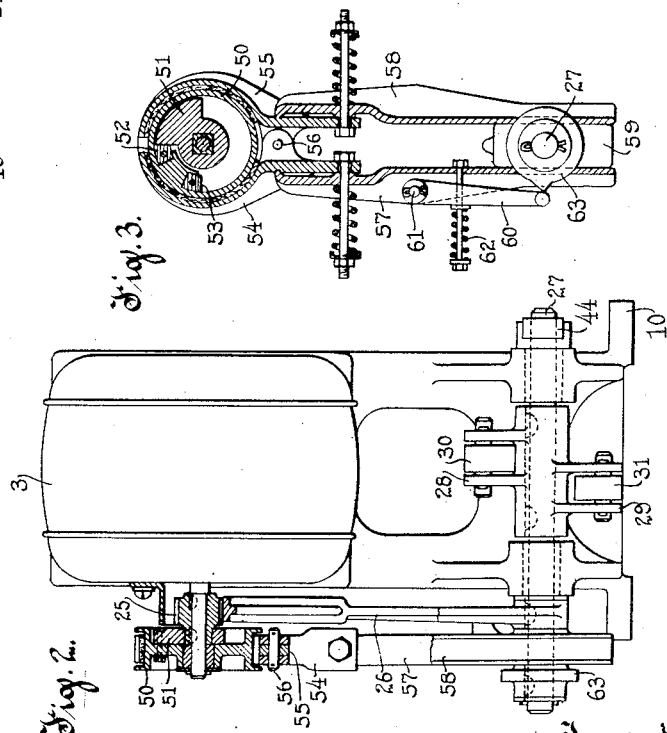
Inventor
Harrison P. Reed
By
Attorney Patented Feb. 27, 1923.

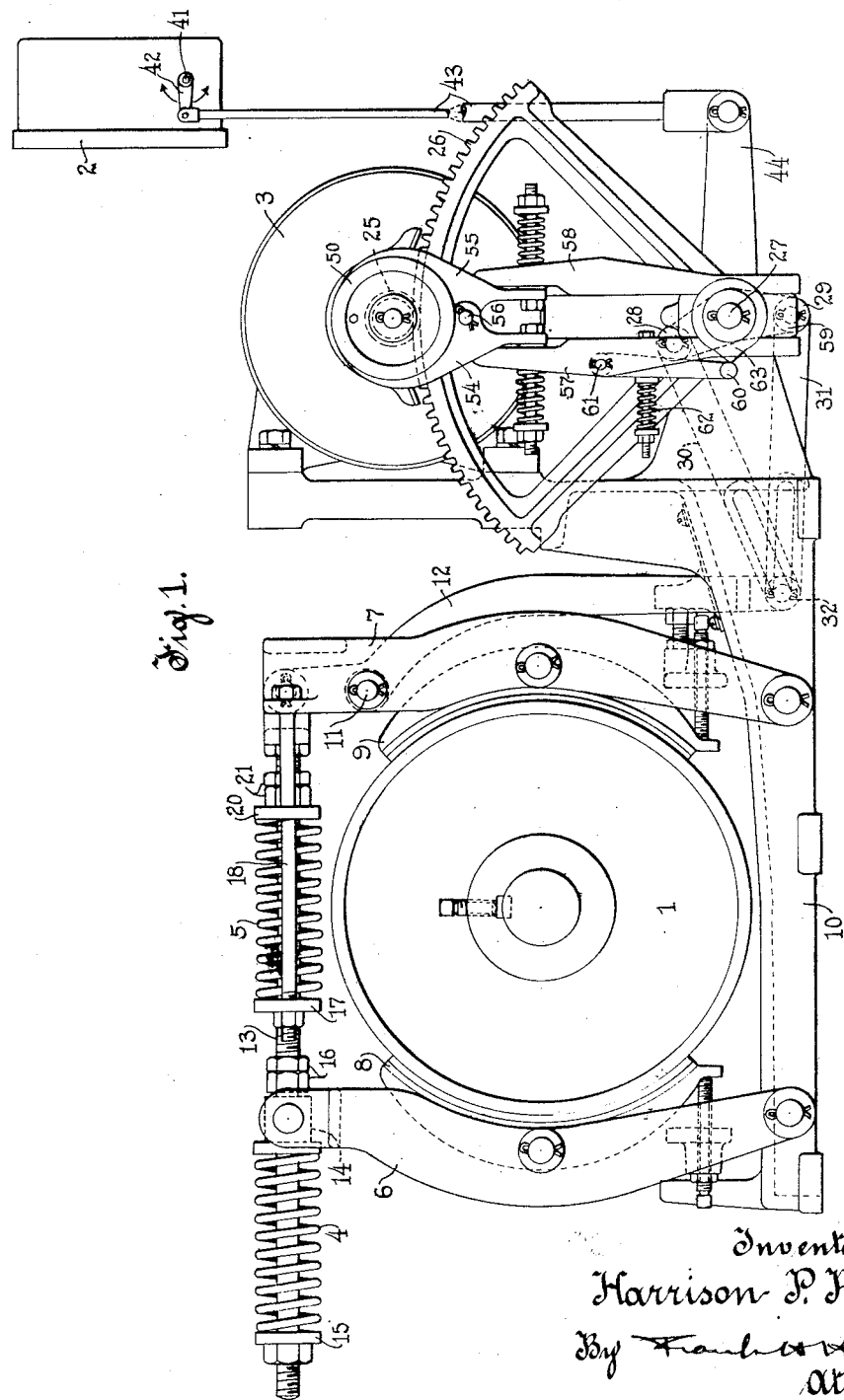

1,446,517

UNITED STATES PATENT OFFICE.

HARRISON P. REED, OF MILWAUKEE, WISCONSIN, ASSIGNOR TO THE CUTLER-HAMMER M'F'G. CO., OF MILWAUKEE, WISCONSIN, A CORPORATION OF WISCONSIN.

BRAKING APPARATUS.

Application filed October 7, 1918. Serial No. 257,119.

*To all whom it may concern:*

Be it known that I, HARRISON P. REED, a citizen of the United States, residing at Milwaukee, in the county of Milwaukee and State of Wisconsin, have invented new and useful Improvements in Braking Apparatus, of which the following is a full, clear, concise, and exact description, reference being had to the accompanying drawing, forming a part of this specification.

This invention relates to braking apparatus for motor driven machinery and more particularly to apparatus including a brake and a control device co-ordinated for joint operation.

While the invention is not limited thereto, it is particularly applicable to braking apparatus for elevators wherein the brake has co-ordinated therewith a switch for controlling the direction of operation of the elevator and wherein spring pressure is employed for setting the brake and neutralizing the switch while a single reversible motor is employed for releasing the brake and operating the switch for reverse operations of the elevator selectively. Where a brake and control device are so co-ordinated the control device imposes an additional load on the brake setting means which has led to difficulty in providing for positive operation of both devices by the brake setting means while maintaining the brake pressure within desired limits and providing the desired sensitivity of the apparatus for phase failure protection, etc.

One object of the present invention is to provide simple and efficient apparatus which will overcome such difficulties and which will provide a considerable range of adjustment.

Another object is to provide separately adjustable spring pressure devices supplying a given force for setting the brake and a greater force for initiating the setting operation of the brake and neutralizing the coordinated switch, such forces being variable independently of one another.

Another object is to provide apparatus of the aforesaid character with means for arresting the same in the desired position upon de-energization of the operating motor.

Other objects and advantages of the invention will hereinafter appear.

The accompanying drawing illustrates one embodiment of the invention and the same will now be described, it being understood that the embodiment illustrated is susceptible of modications falling within the scope of the appended claims.

In the drawing,

Figure 1 is a side elevation of the apparatus;

Fig. 2 is an end view of Fig. 1;

Figs. 3 and 4 are detail views of parts of the apparatus shown in Figs. 1 and 2; and, Fig. 5 is a schematic and diagrammatic view of the apparatus.

Referring to Fig. 1, the same shows apparatus particularly adapted for elevator service, including a drum type of brake 1 and a reversing switch 2, said switch being shown schematically in Fig. 5 and serving to control a driving motor for the apparatus with which said brake is associated. The switch 2 has a neutral position from which it is movable in opposite directions and is operatively connected to the brake to assume neutral position when the latter is set. A reversible motor 3 is provided for releasing the brake upon rotation in either direction and for operating the switch in a direction determined by the direction of rotation of said motor. On the other hand, the brake is normally set and the switch neutralized by spring pressure supplied as hereinafter described by springs 4 and 5.

The brake includes arms 6 and 7 carrying brake shoes 8 and 9 respectively, said arms being fulcrumed at their lower ends to a base plate 10. The arm 7 is bifurcated and has pivoted thereto at a point 11, a lever 12 which has a pivotal connection with a rod 13, said rod projecting through and sliding within a block 14 pivotally mounted in the upper end of arm 6. The spring 4 is mounted upon the rod 13 and is confined between the arm 6 and an adjustable collar 15 threaded onto said rod whereby said spring serves to press said arm towards a stop 16 also threaded onto said rod. The spring 5 is also mounted upon rod 13 and is confined between a crosshead 17 connected by rods 18 and 19 to the upper end of arm 7 and a crosshead 20 slidably mounted on said rods and bearing against an adjustable stop 21 threaded onto rod 13. Accordingly spring 5 tends to separate the crossheads and to thereby bias the arm 7 and said lever relatively for clockwise rotation of the latter, such bias being transmitted through rod 13 and acting on the latter to move the same to the right. Thus assuming spring 5 to exert a force exceeding that of spring 4 it will be apparent that the rod 13 is responsive to the force of the former spring to compress the latter spring against arm 6 to set the brake shoes and that the setting force is limited to the force exerted by spring 4.

The lever 12 is operable by the motor 3 through the medium of connections including a pinion 25 fixed to the motor shaft and meshing with a gear sector 26 fixed to a shaft 27, crank arms 28 and 29 fixed to said shaft and links 30 and 31 connecting said crank arms to lever 12. The extremities of the links 30 and 31 are slotted and the connections between said links and the releasing lever 12 comprises a pin 32 carried by the latter and passing through the slotted portions of the former. This arrangement provides for movement of the lower end of the lever 12 to the right or in other words, counter-clockwise movement of said lever by either link according to the direction of rotation of shaft 27 by the motor 3, while at the same time providing for play of each link relative to the pin upon operation of said lever by the other link. Further, the links co-operate to provide a stop for the lever 12 when moved in a clockwise direction.

Considering the operation of the brake without reference to the switch 2, it will be assumed that said brake is set and that power is supplied to the motor 3 to operate lever 12. Regardless of the direction of operation of the motor the lever is insured counter-clockwise rotation about its pivot, thus moving the rod 13 to the left whereupon the stop 21 moves the crosshead 20 to compress the spring 5, while the stop 16 bears against the arm 6 whereby said lever functions to spread said arms for release of the brake. During this operation the spring 4 is permitted a slight expansion equal to the normal clearance between the stop 16 and the block 14 of arm 6 and accordingly assuming subsequent de-energization of the motor 3 said spring has no immediate effect. On the other hand, the spring 5, which is under compression, is thereupon released and functions to spread the crossheads 17 and 20 with the result of returning lever 12 to its limit and at the same time moving rod 13 to the right to compress spring 4 against arm 6. Spring 4 thereupon functions to reset the brake and as will be apparent the arrangement is such that the setting pressure on the brake is determined by the adjustment of said spring irrespective of the adjustment of spring 5. However, it will be apparent that the full force of spring 5 is available for initiation of the setting operation of the brake and for the performance of additional work, such, for example, as operating the switch 2. In other words, the spring 5 may be adjusted for exerting the maximum force against which the motor 3 will operate or against which it is desired to have the same operate while the spring 4 may be adjusted for any desired lesser force to set the brake thus leaving the difference in forces of the two springs available for operation of the switch 2 or other device. Both adjustments being independent of one another it will therefore be apparent that the apparatus may be readily adapted to varying conditions of service both as regards the brake and the switch.

As illustrated in Fig. 5, the switch 2 comprises two sets of contact arms 35 and 36 which are fixed to the shaft having crank arms 37 and 38 respectively operable by cams 39 and 40 respectively. The cams are fixed to a shaft 41 in a relation to release both sets of contact arms in a given rotary position of said shaft and the latter has a crank arm 42 connected by link 43 to a crank arm 44 fixed to shaft 27. This affords an operative connection between the switch and the motor also affords an operative connection with the brake through the links connecting shaft 27 with the brake releasing lever 12. Accordingly when the brake is set as above described it operates the switch 2 in one direction or the other according to the link which is brought into play thereby tending always to restore said switch towards neutral position and the arrangement is such as to permit the switch to open to a maximum degree when the brake is set. Further, the arrangement is such as to enable utilization of substantially the full surplus force of spring 5 for return of the switch 2 to neutral position.

Referring to Figs. 2 and 3, the same show means for arresting the apparatus when the brake is set, thus insuring against accidental reclosure of the switch and release of the brake by over-travel of the motor 3 when driven under the force of springs 4 and 5. This means comprises an auxiliary brake which is in general of the well known type disclosed in the patent to J. C. Coldwell, No. 1,261,771, of April 9, 1918 and includes a drum 50 mounted on the motor shaft and having a lost motion connection therewith, said connection comprising a dog 51 fixed to the motor shaft and co-operating stop blocks 52 and 53 within said drum. The drum has suspended thereon brake shoes 54 and 55 which are pivotally connected at 56 and provided with yielding arms 57 and 58 respectively adapted to be spread by a cam block 59 loosely mounted on shaft 27 and having a lost motion connection with sector 26. The arrangement is such that the block is rotated to spread the arms 57 and 58 to set the auxiliary brake for arrest of motor 3 as the sector runs into its limits but since in the apparatus illustrated the sector occupies an intermediate position when the main brake 1 is set, this auxiliary brake does not afford the desired protection. However, additional means are provided to utilize this type of auxiliary brake to also arrest the motor in set position of the main brake, said means including a lever 60 fulcrumed to arm 57 at a point 61, a spring pressure device 62 affording a resilient connection between lever 60 and arm 57 and a cam 63 fixed to the sector shaft 27 to co-operate with lever 60. The arrangement is such that the cam 63 actuates the lever 60 to compress the spring 62 as the main brake sets thereby actuating the auxiliary brake to quickly bring the motor 2 to rest. In this connection it may be stated that a very slight braking effort will arrest the motor 3 in the desired intermediate position of the sector.

What I claim as new and desire to secure by Letters Patent is:

1. In combination, a brake, a device to be operated during setting operation of said brake and means for both setting said brake and operating said device, said means initially exerting a given force and including means to definitely curtail such force prior to completion of the setting operation of said brake.

2. In combination, a brake, a device to be operated during setting operation of said brake and means for both setting said brake and operating said device, said means being adjustable to regulate the force exerted thereby on said brake for different portions of the setting range thereof.

3. In combination, a brake, a device to be operated during setting operation of said brake and co-operating devices tending to set said brake and operate the former device, said co-operating devices providing different predetermined forces for operation of said brake through different portions of its setting range.

4. In combination, a brake, a device to be operated during setting operation of said brake and co-operating devices tending to set said brake and operate the former device, said co-operating devices providing different predetermined forces for operation of said brake through different portions of its setting range and being adjustable for variation of either or all of such forces.

5. In combination, a brake, a switch to be operated during setting operation of said brake and a plurality of progressively acting devices to set said brake and also operate said switch, said devices supplying forces of different magnitude.

6. In combination, a brake, a switch to be operated during setting operation of said brake and a plurality of progressively acting devices for setting said brake and also operating said switch, said devices supplying forces of different magnitude and being independently adjustable for variation of either or all of such forces.

7. In combination, a brake, a switch to be operated during setting operation thereof and a plurality of springs associated with said brake to act progressively for setting the same and for operating said switch, said springs exerting forces of different magnitude to provide a given force for initiation of the setting operation of said brake and operation of said switch and a lesser force for completing the setting operation of said brake.

8. In combination, a brake, a switch to be operated during setting operation of said brake, a plurality of springs associated with said brake to act progressively for setting the same and for operating said switch, said springs exerting forces of different magnitude to provide a given force for initiation of the setting operation of said brake and operation of said switch and a lesser force for completing the setting operation of said brake and means for independently adjusting said springs to vary the forces exerted thereby.

9. In apparatus of the character set forth, in combination, a brake, a switch, a reversible motor, operative connections between the aforesaid elements providing for release of said brake and operation of said switch in different ways selectively by reverse operations of said motor and further providing for return of said switch to a given position upon setting of said brake, means tending to set said brake and means for braking said reversible motor upon setting of the said brake and return of said switch.

10. In apparatus of the character set forth, in combination, a brake, a switch, a reversible motor, operative connections between the aforesaid elements providing for release of said brake upon operation of said motor in either direction and operation of said switch in different ways selectively by reverse operations of said motor, said connections further providing for return operation of said switch and rotation of said motor by said brake in setting, energy storing means for setting said brake and an auxiliary brake for arresting said motor upon completion of the setting operation of said first mentioned brake.

11. In apparatus of the character set forth, in combination, a brake, a switch, a reversible motor, operative connections between the aforesaid elements providing for release of said brake upon operation of said motor in either direction and operation of said switch in different ways selectively by reverse operations of said motor, said connections further providing for return operation of said switch and rotation of said motor by said brake in setting, energy storing means for resetting said brake and an auxiliary brake for arresting said motor upon completion of the releasing and setting operations of said first mentioned brake.

12. In combination, a brake, a device to be operated therewith, a motor for releasing said brake and springs associated with said brake to act progressively thereon for setting the same, said springs exerting forces of different magnitude to provide a given setting force and an increased force for initiation of the setting operation of said brake and operation of said device.

13. In a brake, in combination, a drum, arms provided with brake shoes to engage said drum, a releasing lever fulcrumed to one of said arms, a rod pivotally connected to said lever, a stop on said rod to engage the other of said arms for effecting release of said brake shoes upon operation of said lever in one direction, a spring mounted on said rod and bearing against one of said arms to effect setting of said brake shoes when said lever is moved in a reverse direction and a second spring mounted on said rod and acting upon said lever and the arm upon which the same is mounted, to bias said lever in the last mentioned direction, the force exerted by said second mentioned spring exceeding that exerted by said first mentioned spring for the purpose set forth.

In witness whereof, I have hereunto subscribed my name.

HARRISON P. REED.